United States Patent [19]

Visser et al.

[11] Patent Number: 5,679,463
[45] Date of Patent: Oct. 21, 1997

[54] CONDENSATION-CURED PDMS FILLED WITH ZINC OXIDE AND TIN OXIDE MIXED FILLERS FOR IMPROVED FUSING MEMBER MATERIALS

[75] Inventors: Susan Ann Visser, Rochester; William Bernard Vreeland, Webster; Charles Eugene Hewitt, Rochester, all of N.Y.

[73] Assignee: Eastman Kodak Company, Rochester, N.Y.

[21] Appl. No.: 630,150

[22] Filed: Apr. 10, 1996

[51] Int. Cl.$^6$ .................................................. B32B 25/20
[52] U.S. Cl. ........................... 428/447; 428/448; 428/450; 492/56; 492/59
[58] Field of Search .................................. 428/447, 448, 428/450, 36.9, 36.91, 36.92; 492/53, 56, 59; 524/432, 434

[56] References Cited

U.S. PATENT DOCUMENTS

| | | | |
|---|---|---|---|
| 2,964,431 | 12/1960 | Kalish et al. | 437/134 |
| 3,964,431 | 6/1976 | Namiki | 118/60 |
| 4,019,024 | 4/1977 | Namiki | 219/469 |
| 4,074,001 | 2/1978 | Imai et al. | 428/329 |
| 4,257,699 | 3/1981 | Lentz | 399/324 |
| 4,336,766 | 6/1982 | Maher et al. | 118/60 |
| 4,357,388 | 11/1982 | Minor | 428/331 |
| 4,515,884 | 5/1985 | Field et al. | 430/99 |
| 4,659,621 | 4/1987 | Finn et al. | 428/339 |
| 5,248,560 | 9/1993 | Baker et al. | 428/425 |

FOREIGN PATENT DOCUMENTS 0 430 677  6/1991  European Pat. Off. ........ G03C 15/20

*Primary Examiner*—D. S. Nakarani
*Attorney, Agent, or Firm*—John R. Everett

[57] ABSTRACT

There is described a fuser member having a layer comprising a condensation-cured poly(dimethyl siloxane) elastomer filled with a mixture of tin oxide and zinc oxide wherein the layer contains from about 5 to about 40 volume percent of said mixture and wherein the proportion of tin oxide to zinc oxide in said mixture is between about 25:1 and 1:25 by volume. The fuser member exhibits a good combination of properties such as improved creep resistance, decreased weight loss, improved hardness stability, or improved thermal conductivity compared with members using other filler materials, for example, tin oxide alone or zinc oxide alone.

12 Claims, No Drawings

CONDENSATION-CURED PDMS FILLED WITH ZINC OXIDE AND TIN OXIDE MIXED FILLERS FOR IMPROVED FUSING MEMBER MATERIALS

CROSS REFERENCE TO RELATED APPLICATION

Reference is made to and priority claimed from U.S. Provisional application Ser. No. U.S. 60/001,679, filed 31 Jul. 1995, entitled CONDENSATION-CURED PDMS FILLED WITH ZINC OXIDE AND TIN OXIDE MIXED FILLERS FOR IMPROVED FUSING MEMBER MATERIALS.

1. Field of the Invention

The present invention relates to fuser members for electrostatographic fusing.

2. Background of the Invention

Internally heated fusing members are required for many electrostatographic applications. Few polymers can withstand the continuous high temperatures that are characteristic of the electrostatographic fusing process. Polysiloxanes are one class of materials that have been found to be useful member materials, but their usefulness as coatings on internally heated members requires the addition of fillers to promote thermal conductivity. The addition of fillers can change more than the thermal conductivity of the polymer.

The materials must satisfy a number of requirements, including the maintenance of dimensional stability and hardness over time in the machine. It has been found that a number of materials, when subjected to the extended periods of high temperatures and cyclic stress that are characteristic of the life of electrostatographic fusing materials, tend to exhibit changes in hardness with time. These changes lead to changes in the nip width that can lead to degradation in fusing properties and in image quality. Changes in the specific gravity and crosslink density of the material are also observed and correlate with changes in hardness, indicating that thermal instability causes the changes.

In addition, it has been found advantageous in many applications to use a tapered pressure member as the fuser member in order to reduce paper wrinkle. The tapered or "bow-tie" (wide at the ends tapering towards the center) configuration places the paper under tension, reducing wrinkling. The advantages of this geometry require that the fusing member maintain its shape over the lifetime of the members. However, it has been found that the shape of the fusing members changes over time to conform to that of the pressure member, causing a loss of the paper handling improvements. These shape changes are referred to as "creep."

The changes in hardness and shape result from the thermal instability of the member materials. In the past, this thermal instability has been characterized by examining the behavior of the materials under no load or under a continuous load when incubated at elevated temperature. However, it has been demonstrated recently that the combination of high temperatures and cyclic stress results in a faster rate of creep than high temperature and continuous stress. Thus, study of materials under high temperature and cyclic stress is a more accurate representation of material behavior in an electrostatographic process.

Condensation-crosslinked PDMS (polydimethyl siloxane) is often used in fusing members. An example of such a material is Emerson Cummings's (now Grace Specialty Polymers) Stycast® 4952, a condensation-crosslinked PDMS elastomer filled with 32–37 vol % aluminum oxide and 2–6 vol % iron oxide. This composition is widely used in commercially available fusing members. Although used in many fusing applications, the material exhibits substantial creep, weight loss and hardness changes over its lifetime as a fuser member, decreasing its useful life.

Some condensation-crosslinked PDMS elastomers that show less change in hardness and creep than EC4952 or aluminum oxide-filled PDMS are disclosed in U.S. patent application Ser. No. 08/167,584 (tin oxide filler), U.S. Pat. No. 5,292,606 (zinc oxide filler), U.S. Pat. No. 5,269,740 (copper oxide filler), U.S. Pat. No. 5,292,562 (chromium oxide filler), and U.S. Pat. No. 5,336,539 (nickel oxide filler).

One problem with the incorporation of metal oxide fillers into a PDMS matrix for use on fusing members is the high surface energy of the fillers compared to PDMS. The higher surface energy results in a greater degree of toner adhesion to a highly-filled PDMS elastomer fusing member coating. Toner adhesion or offset ultimately leads to paper jams and a decrease in the useful life of the member. Unfortunately, the amount of filler added to the PDMS elastomer coating is governed by the thermal conductivity of the coating, as a certain minimum level of thermal conductivity is required for adequate fusing. Therefore, it is desirable to use a filler that gives a material with as high a thermal conductivity as possible so that adequate image quality is maintained while toner offset is minimized.

There are also many cases in which a non-thermally conductive overcoat is coated over the base cushion layer of a fusing member in order to improve the toner release characterisitics. In order to maintain high image quality without increasing the fusing temperature in systems with a non-thermally conductive overcoat, a base cushion of increased thermal conductivity is often used. However, as the overcoat materials are often harder than a typical elastomer, it is also desirable to have a base cushion layer of lower hardness in order to compensate for the harder properties of the overcoat and still maintain an adequate nip width. A base material of higher thermal conductivity can be produced by increasing the level of thermally conductive filler in the elastomer. However, this will also increase the hardness of the elastomer. In order to increase the thermal conductivity of the elastomer without substantially increasing the hardness, a filler that imparts higher thermal conductivity to the elastomer is required.

As noted, one proposed fuser member material includes a zinc oxide filler. While improved over some materials using other fillers, the zinc oxide containing materials do not have as high a thermal conductivity as is desired. Another proposed material includes tin oxide as the filler. However, these materials have less than desired stability at high temperature under cyclic stress.

It is the objective of the present invention to improve the hardness (storage modulus) stability and minimize the creep (length change) of a condensation-cured PDMS under conditions of elevated temperature and cyclic stress while also improving the thermal conductivity of the elastomer through the use of mixtures of tin oxide and zinc oxide fillers.

SUMMARY OF THE INVENTION

In accordance with the present invention there is provided a fuser member having a layer comprising a condensation-cured poly(dimethyl siloxane) elastomer filled with a mixture of tin oxide and zinc oxide wherein the layer contains from about 5 to about 40 volume percent of said mixture and wherein the proportion of tin oxide to zinc oxide in said mixture is between about 25:1 and 1:25 by volume.

The fuser member of the present invention exhibits a good combination of properties such as improved creep

DETAILED DESCRIPTION

The invention is directed to fuser rolls and, more generally, to what are referred to herein as fuser members. The term "fuser member" is used to refer to components of an electrographic fusing system that engage a toner carrying receiver and fuse the toner by means of elevated temperature and pressure. Examples of such members include fuser rollers, pressure rollers, fuser platens, and fuser belts. The term fuser member is also used herein to refer to similar components, subject to similar conditions used in non-electrophotographic equipment.

The fuser member usually comprises a rigid support covered with a resilient material, which will be referred to herein as a "base cushion layer." The resilient base cushion layer and the amount of pressure exerted by the pressure roll serve to establish the area of contact of the fuser with the toner-bearing surface of the receiver sheet as it passes through the nip of the pair of rolls. The size of this area of contact helps to establish the length of time that any given portion of the toner image will be in contact with and heated by the fuser member. Thus, the fuser member of the present invention includes a layer having the material as defined, and this layer can be the base cushion layer or it can be another layer of the member, for example, an overcoat layer.

One of the components of the layers used in the fuser members of the invention is a condensation-cured poly (dimethyl siloxane) elastomer. The condensation-crosslinked PDMS elastomer can be formed by condensation reaction of silanol-terminated PDMS polymers with multifunctional silanes.

Silanol-terminated PDMS polymers and methods of their preparation are well known. They are readily commercially available, e.g., from United Chemicals Inc., 80 Centennial Ave., Piscataway, N.J., U.S.A., and have the structure:

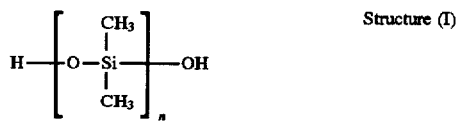

Structure (I)

For purpose of the present invention n is an integer such that the Structure (I) polymer (or mixture thereof) has a weight average molecular weight of from 7,000 to 70,000. If the molecular weight were below 7,000, the final crosslinked PDMS would have a high crosslink density that would make the material too hard and brittle, and not resilient enough to serve practically. If the molecular weight were above 70,000, the final crosslinked PDMS would be too unstable under conditions of high temperature and cyclic stress (i.e., there would be too much creep and change in hardness over time).

The multifunctional silanes that can serve as crosslinking agents for the Structure (I) polymers are well known for this purpose. Each of such silanes comprises a silicon atom bonded to at least three groups that are functional to condense with the hydroxy end groups of the Structure (I) polymers to thereby create siloxane crosslinks through the silicon atom of the silane. The functional groups of the silanes can be, for example, acyloxy (R—COO—), alkenoxy (CH$_2$=C(R)O—), alkoxy (R—O—), dialkylamino (R$_2$N—), or alkyliminoxy (R$_2$C=N—O—) groups, wherein R represents an alkyl moiety. Examples of specific crosslinkers used in condensation curing reactions of PDMS are: tetramethylorthosilicate, tetraethylorthosilicate, 2-methoxyethylsilicate, tetrahydro-furfurylsilicate, ethylpolysilicate, butylsilicate, methyltrimethoxysilane, methyltripropenoxysilane, methyltriacetoxysilane, methyltris(butanone oxime)silane, and methyltris (diethylamino)silane.

In the case where alkoxy functional groups are employed, the condensation crosslinking reaction can be carried out with the aid of a catalyst, such as, for example, a titanate, chloride, oxide, or carboxylic acid salt of zinc, tin, iron, or lead. Specific examples of catalysts are dibutyltin diacetate, tin octoate, zinc octoate, dibutyltin dichloride, dibutyltin dibutoxide, ferric chloride, lead dioxide, or mixtures of catalysts.

The tin oxide particles employed as filler in the described layer can be obtained from any convenient commercial source, e.g., Magnesium Elektron Inc, Flemington N.J., U.S.A. The zinc oxide particles can be obtained from Zinc Corporation of America. The particle size of the oxides used does not appear to be critical. Particle sizes anywhere in the range of 0.1 to 100 micrometers have been found to be acceptable. In the examples presented below, both the tin oxide particles and the zinc oxide particles were from 1 to 40 micrometers in diameter.

The ratio of the tin to zinc oxides is between about 25:1 and 1:25 by volume. In preferred embodiments, the range is between about 19:1 and 1:19. In still further preferred embodiments, the ratio of tin oxide to zinc oxide is about 19:1. The incorporation of the small amount of zinc oxide improves the stability to high temperatures under cyclic stress to a great extent and the high proportion of tin oxide maintains the desired high thermal conductivity. We unexpectedly found that the improvement with the addition of zinc oxide was not linear. In other words, the addition of a small amount of zinc oxide to the tin oxide produced a dramatic improvement in the stability to high temperatures under cyclic stress.

The mixed oxide filler particles are mixed with the Structure (I) polymer and multifunctional silane crosslinker prior to curing the mix on the fuser roll core to form the base cushion layer. The mixed oxide particles comprise from 5 to 40 percent of the total volume of the base cushion layer. Concentrations less than 5 volume percent may not provide the degree of stability desired to the layer. Concentrations greater than 40 volume percent will render the layer too hard to provide the desired area of contact with the toner-bearing receiver sheet.

The preferred embodiments of the invention include a) 55–90 vol % silanol-terminated (α,ωto-hydroxy-)poly (dimethyl siloxane); b) 2–5.00 vol % crosslinker; c) 0.1–0.4 vol % catalyst. As noted previously, the filler is present in an amount of between 5 and 40 volume percent.

The member core, usually cylindrical in shape, can be composed of any rigid metal, ceramic, or plastic substance. The material should have sufficiently ductility to avoid breakage of the core during normal maintenance and operation of an electrophotographic machine. Metal cores are preferred if the member is to be internally heated because of the high thermal conductivity of metal. Suitable core materials can include aluminum, stainless steel, metal alloys, ceramic materials, combinations of ceramic and polymeric materials, and polymeric materials such as thermoset resins with or without reinforcing additives.

To form the layer of a fuser member in accordance with the invention, the Structure (I) polymer, a slight excess of the stoichiometric amount of multifunctional silane to form crosslinks with all the hydroxy end groups of the Structure (I) polymer, and the appropriate amount of filler are thoroughly mixed on a three-roll mill. If a catalyst is necessary, it is then added to the mix with thorough stirring. The mix is then degassed and injected into a mold surrounding the fuser member, e.g. roll, core to mold the material onto the core. The covered core remains in the mold for a time sufficient for some crosslinking to occur (e.g., 18 hours). The covered roll is then removed from the mold and heated to accelerate the remaining crosslinking.

Where the layer of the invention is a base cushion layer, it is currently preferred to apply the layer of the invention over a support which has been conversion coated and primed with metal alkoxide primer in accordance with a U.S. Patent Application filed by Allen Kass, Oct. 21, 1993, entitled "FUSING MEMBER FOR ELECTROSTATOGRAPHIC REPRODUCING APPARATUS AND METHOD FOR PREPARING FUSING MEMBER".

If the described layer is coated over another coating layer, one or more methods of layer-to-layer adhesion improvement, such as corona discharge treatment of the other coating layer's surface, may be applied prior to application of the material. Various methods of layer-to-layer adhesion improvement are well known to one skilled in the art.

The described layer can be an outer coating layer over an oil barrier layer. An oil-barrier layer can be obtained by coating an underlying silicone elastomer, coated directly or indirectly on a cylindrical core, with a composition formed by compounding a mixture comprising a fluorocarbon copolymer, a fluorocarbon-curing agent, a curable polyfunctional poly($C_1$-6 alkyl)phenylsiloxane polymer, one or more fillers and an accelerator for promoting crosslinking between the curing agent and the fluorocarbon copolymer.

Release oils can be used with the fuser members of the invention although it is not always necessary or desirable. When used, the oil is continuously coated over the surface of the fuser member in contact with the toner image. The fuser member of the invention can be used with polydimethylsiloxane (or polydimethyldiphenylsiloxanes or polymethylphenyl siloxanes) or mercapto functionalized polydimethylsiloxane release oils at normally used application rates or at reduced application rates, from about 0.5 mg/copy to 10 mg/copy (the copy is 8.5 by 11 inch 20 pound bond paper).

For description of other layers and materials therefor that can be usefully provided over fuser roll base cushion layers, see, for example, U.S. Pat. Nos. 4,375,505; 4,430,406; 4,501,482; and 4,853,737. In some specific embodiments of the present invention, the base cushion layer has one other layer thereover, which is an oil-barrier layer comprising poly(vinylidene fluoride-co-hexafluoropropylene), a material commercially available, for example, from DuPont, U.S.A., under the trademark, Viton® A. In some other specific embodiments, there are two layers over the base cushion layer, e.g., an oil-barrier layer and, thereover, an outermost layer that provides good wear-resistance and toner-release properties, comprising, for example, a vinyl-addition-crosslinked PDMS having silica and titania fillers dispersed therein, such as is commercially available from Dow-Corning, U.S.A., under the trademark, Silastic® E. Usually, the other layer or layers, when employed, are flexible but thinner than the base cushion layer, so that the base cushion layer can provide the desired resilience to the fuser roll, and the other layers can flex to conform to that resilience without having to be resilient themselves. The thickness of the base cushion layer and other layers will be chosen with consideration of the requirements of the particular application intended. For example, base cushion layer thicknesses in the range from 0.6 to 5.0 mm have been found to be appropriate for various applications. In some embodiments of the present invention, the base cushion layer is about 2.5 mm thick, and any oil-barrier and/or wear-resistant toner-release layers thereover are each about 25 to 30 micrometers thick.

The fusing members produced in accordance with the present invention are thus useful in electrophotographic copying machines to fuse heat-softenable toner to a substrate. This can be accomplished by contacting a receiver, such as a sheet of paper, to which toner particles are electrostaticly attracted in an imagewise fashion with such a fusing member. Such contact is maintained at a temperature and pressure sufficient to fuse the toner to the receiver.

The following specific materials were used in the examples which follow:

The silanol-terminated PDMS (DC3-0133; viscosity=2 Pa s) was obtained from Dow Corning Corporation, Midland, Mich. Size exclusion chromatography (SEC) results show that it has a number average molecular weight of 11,200 and a weight average molecular weight of 43,400, relative to a polystyrene standard.

The samples were analyzed by size exclusion chromatography (SEC) in toluene using three PLgel Mixed B 7.5×300 mm mixed bed columns (Polymer Laboratories, Inc., Amherst, Mass.). The column set was calibrated with narrow-molecular weight distribution polystyrene standards between 595 and 2,750,000 daltons. Distributions and molecular weight averages have not been corrected for axial dispersion. The long term precision of $M_w$ (weight average molecular weight) for a broad polystyrene standard using this method is ±5%.

Another silanol-terminated PDMS, (PS342.5, viscosity= 0.75 Pa s) was obtained from United Chemicals, 80 Centennial Ave., Piscataway, N.J. Tetraethoxysilane (TEOS) crosslinker was obtained from Pfaltz and Bauer, 172 E. Aurora Street, Waterbury, Conn. The zinc oxide used was designated XX503R from Zinc Corporation of America, 300 Frankfort Rd., Rt. 18, Monaca, Pa.; it had a particle size range of 2–40 mm. Tin oxide filler was purchased from Magnesium Elektron, Inc., 500 Point Breeze Rd., Flemington, N.J.; it also had a particle size range of 2–40 mm. Dibutyltin diacetate catalyst was obtained from Kodak. All chemicals were used as received.

A high temperature/cyclic stress test was performed using a Mechanical Energy Resolver (MER) [commercially available from Instrumentors, Inc., 22077 Drake Road, Strongsville, Ohio 44136], as described in J. J. Fitzgerald et al, Polymer Eng. Sci. 1992, 32, 1350.

The following examples are presented for a further understanding of the invention.

EXAMPLE 1

Layer Contains 38% zinc oxide/2% tin oxide
Formulation:

|  | vol % | wt % |
|---|---|---|
| Poly(dimethyl siloxane) DC3-0133 | 56.80 | 19.47 |
| TEOS | 2.99 | 0.97 |
| dibutyltin diacetate | 0.21 | 0.10 |
| zinc oxide | 38 | 74.58 |
| tin oxide | 2 | 4.88 |

A slab of material for testing as a fuser member was prepared. To prepare the slab, the poly(dimethyl siloxane)

DC3-0133, TEOS, and filler were blended on a 3-roll mill, a standard procedure. Catalyst was mixed into the formulation by hand immediately prior to use. After catalyst addition, the mixture was degassed for 30 minutes and injected into a 5"×5"×075" (12.7 cm×12.7 cm×1.9 mm) mold, where it was incubated for 12 hours at room temperature. The material slab was removed from the mold and further incubated by ramping to 205° C. over the course of 12 hours and holding at 205° C. for an additional 18 hours.

Thermal conductivity was measured with a Holometrix® TCA-100 thermal conductivity analyzer at 175° C.

Six circular disks of 12 mm diameter were cut from the slab and used for MER testing, as described previously. The storage modulus (S.M.) was calculated according to the method described in the reference. The disks were stacked one on top of the other, weighed, and placed in the MER. The instrument heated the stack to 218° C., and a static compressive force of 8 kg was imposed. The initial length of the stack and its initial hardness (expressed in terms of the initial storage modulus or "Initial S.M.") were measured under the 8 kg initial compressive force. The MER then imposed a cyclic stress on the sample stack by sinusoidally varying the initial compressive force by 4 kg rms at a frequency of 30 Hz for 60 hours. After 60 hours, the final hardness (final storage modulus or "Final S.M.") and length of the six-disk stack under the static 8 kg compressive force were measured. The final weight of the sample stack was also measured.

The thermal conductivity and MER results are summarized in Table 1.

EXAMPLE 2

35% zinc oxide/5% tin oxide
Formulation:

|  | vol % | wt % |
| --- | --- | --- |
| Poly(dimethyl siloxane) DC3-0133 | 56.80 | 19.20 |
| TEOS | 2.99 | 0.96 |
| dibutyltin diacetate | 0.21 | 0.10 |
| zinc oxide | 35 | 67.73 |
| tin oxide | 5 | 12.02 |

The slab was prepared for this sample as described in example 1, except that 35 vol % zinc oxide and 5 vol % tin oxide filler was used. The sample was tested for thermal conductivity and for thermal stability under cyclic strain using the MER, as described above.

The thermal conductivity and MER results are summarized in Table 1.

EXAMPLE 3

25% zinc oxide/15% tin oxide
Formulation:

|  | vol % | wt % |
| --- | --- | --- |
| Poly(dimethyl siloxane) DC3-0133 | 56.80 | 18.34 |
| TEOS | 2.99 | 0.92 |
| dibutyltin diacetate | 0.21 | 0.09 |
| zinc oxide | 25 | 46.21 |
| tin oxide | 15 | 34.45 |

The slab was prepared for this sample as described in example 1, except that 25 vol % zinc oxide and 15 vol % tin oxide filler was used. The sample was tested for thermal conductivity and for thermal stability under cyclic strain using the MER, as described above.

The thermal conductivity and MER results are summarized in Table 1.

EXAMPLE 4

15% zinc oxide/25% tin oxide
Formulation:

|  | vol % | wt % |
| --- | --- | --- |
| Poly(dimethyl siloxane) DC3-0133 | 56.80 | 17.55 |
| TEOS | 2.99 | 0.88 |
| dibutyltin diacetate | 0.21 | 0.09 |
| zinc oxide | 15 | 26.54 |
| tin oxide | 25 | 54.95 |

The slab was prepared for this sample as described in example 1, except that 15 vol % zinc oxide and 25 vol % tin oxide filler was used. The sample was tested for thermal conductivity and for thermal stability under cyclic strain using the MER, as described above.

The thermal conductivity and MER results are summarized in Table 1.

EXAMPLE 5

2% zinc oxide/38% tin oxide
Formulation:

|  | vol % | wt % |
| --- | --- | --- |
| Poly(dimethyl siloxane) DC3-0133 | 56.80 | 16.62 |
| TEOS | 2.99 | 0.83 |
| dibutyltin diacetate | 0.21 | 0.08 |
| zinc oxide | 2 | 3.35 |
| tin oxide | 38 | 79.11 |

The slab was prepared for this sample as described in example 1, except that 2 vol % zinc oxide and 38 vol % tin oxide filler was used. The sample was tested for thermal conductivity and for thermal stability under cyclic strain using the MER, as described above.

The thermal conductivity and MER results are summarized in Table 1.

Comparative Example 1

40% tin oxide
Formulation:

|  | vol % | wt % |
| --- | --- | --- |
| Poly(dimethyl siloxane) PS342.5 | 56.80 | 16.49 |
| TEOS | 2.99 | 0.82 |
| dibutyltin diacetate | 0.21 | 0.08 |
| tin oxide | 40.00 | 82.60 |

The slab was prepared for this sample as described in example 1, except that PS342.5 silanol-terminated PDMS was substituted for DC3-0133 and 40 vol % tin oxide filler and no zinc oxide filler was used. The sample was tested for thermal conductivity and for thermal stability under cyclic strain using the MER, as described above.

The thermal conductivity and MER results are summarized in Table 1.

Comparative Example 2

30% zinc oxide

Formulation:

|  | vol % | wt % |
|---|---|---|
| Poly(dimethyl siloxane) DC3-0133 | 66.26 | 27.42 |
| TEOS | 3.49 | 1.37 |
| dibutyltin diacetate | 0.25 | 0.14 |
| zinc oxide | 30.00 | 71.07 |

The slab was prepared for this sample as described in example 1, except that 30 vol % zinc oxide and no tin oxide filler was used. The sample was tested for thermal conductivity and for thermal stability under cyclic strain using the MER, as described above.

The thermal conductivity and MER results are summarized in Table 1.

EXAMPLE 6

20% zinc oxide/10% tin oxide

Formulation:

|  | vol % | wt % |
|---|---|---|
| Poly(dimethyl siloxane) DC3-0133 | 66.26 | 25.93 |
| TEOS | 3.49 | 1.30 |
| dibutyltin diacetate | 0.25 | 0.13 |
| zinc oxide | 20 | 44.81 |
| tin oxide | 10 | 27.83 |

The slab was prepared for this sample as described in example 1, except that 20 vol % zinc oxide and 10 vol % tin oxide filler was used. The sample was tested for thermal conductivity and for thermal stability under cyclic strain using the MER, as described above.

The thermal conductivity and MER results are summarized in Table 1.

EXAMPLE 7

10% zinc oxide/20% tin oxide

Formulation:

|  | vol % | wt % |
|---|---|---|
| Poly(dimethyl siloxane) DC3-0133 | 66.26 | 24.60 |
| TEOS | 3.49 | 1.23 |
| dibutyltin diacetate | 0.25 | 0.12 |
| zinc oxide | 10 | 21.25 |
| tin oxide | 20 | 52.80 |

The slab was prepared for this sample as described in example 1, except that 10 vol % zinc oxide and 20 vol % tin oxide filler was used. The sample was tested for thermal conductivity and for thermal stability under cyclic strain using the MER, as described above.

The thermal conductivity and MER results are summarized in Table 1.

EXAMPLE 8

5% zinc oxide/25% tin oxide

Formulation:

|  | vol % | wt % |
|---|---|---|
| Poly(dimethyl siloxane) DC3-0133 | 66.26 | 23.98 |
| TEOS | 3.49 | 1.20 |
| dibutyltin diacetate | 0.25 | 0.12 |
| zinc oxide | 5 | 10.36 |
| tin oxide | 25 | 64.34 |

The slab was prepared for this sample as described in example 1, except that 5 vol % zinc oxide and 25 vol % tin oxide filler was used. The sample was tested for thermal conductivity and for thermal stability under cyclic strain using the MER, as described above.

The thermal conductivity and MER results are summarized in Table 1.

Comparative Example 3

30% tin oxide

Formulation:

|  | vol % | wt % |
|---|---|---|
| Poly(dimethyl siloxane) DC3-0133 | 66.26 | 23.39 |
| TEOS | 3.49 | 1.17 |
| dibutyltin diacetate | 0.25 | 0.12 |
| tin oxide | 30.00 | 75.32 |

The slab was prepared for this sample as described in example 1, except that 30 vol % tin oxide and no zinc oxide filler was used. The sample was tested for thermal conductivity and for thermal stability under cyclic strain using the MER, as described above.

The thermal conductivity and MER results are summarized in Table 1.

Comparative Example 4

15% zinc oxide

Formulation:

|  | vol % | wt % |
|---|---|---|
| Poly(dimethyl siloxane) PS342.5 | 80.46 | 47.12 |
| TEOS | 4.24 | 2.36 |
| dibutyltin diacetate | 0.30 | 0.24 |
| zinc oxide | 15.00 | 50.29 |

The slab was prepared for this sample as described in example 1, except that PS342.5 silanol-terminated PDMS was substituted for DC3-0133 and 15 vol % zinc oxide and no tin oxide filler was used. The sample was tested for thermal conductivity and for thermal stability under cyclic strain using the MER, as described above.

The thermal conductivity and MER results are summarized in Table 1.

EXAMPLE 9

10% zinc oxide/5% tin oxide

Formulation:

|  | vol % | wt % |
| --- | --- | --- |
| Poly(dimethyl siloxane) DC3-0133 | 80.46 | 45.28 |
| TEOS | 4.24 | 2.26 |
| dibutyltin diacetate | 0.30 | 0.23 |
| zinc oxide | 10 | 32.22 |
| tin oxide | 5 | 20.01 |

The slab was prepared for this sample as described in example 1, except that 10 vol % zinc oxide and 5 vol % tin oxide filler was used. The sample was tested for thermal conductivity and for thermal stability under cyclic strain using the MER, as described above.

The thermal conductivity and MER results are summarized in Table 1.

EXAMPLE 10

5% zinc oxide/10% tin oxide

Formulation:

|  | vol % | wt % |
| --- | --- | --- |
| Poly(dimethyl siloxane) DC3-0133 | 80.46 | 43.58 |
| TEOS | 4.24 | 2.18 |
| dibutyltin diacetate | 0.30 | 0.22 |
| zinc oxide | 5 | 15.50 |
| tin oxide | 10 | 38.52 |

The slab was prepared for this sample as described in example 1, except that 10 vol % zinc oxide and 5 vol % tin oxide filler was used. The sample was tested for thermal conductivity and for thermal stability under cyclic strain using the MER, as described above.

The thermal conductivity and MER results are summarized in Table 1.

Comparative Example 5

Stycast® 4952

Condensation-curable PDMS filled with 32–37 vol % aluminum oxide and 2–6 vol % iron oxide particulate fillers is commercially available from Grace Specialty Polymers (formerly Emerson & Cummings), U.S.A., under the trade name Stycast® 4952. Samples of Stycast® 4952 were prepared by mixing 200 pts by weight of the filled PDMS material with 1 pt by weight CAT 50 catalyst. (CAT 50 is a catalyst mixture that is commercially available from Grace Specialty Polymers, formerly Emerson & Cummings.) The catalyst was stirred into the sample by hand, and the sample was degassed for 30 min. before being injected into the 5"×5"×0.075" (12.7 cm×12.7 cm×1.9 mm) mold. The sample was cured and tested for thermal conductivity and thermal stability under cyclic strain using the MER, as described in Example 1.

The thermal conductivity and MER results are summarized in Table 1.

Comparative Example 6

35% aluminum oxide

Formulation:

|  | vol % | wt % |
| --- | --- | --- |
| Poly(dimethyl siloxane) PS342.5 | 61.56 | 29.92 |
| TEOS | 3.21 | 1.55 |
| dibutyltin diacetate | 0.23 | 0.15 |
| aluminum oxide | 35.00 | 68.38 |

The slab was prepared for this sample as described in Comparative Example 4, except that 35 vol % aluminum oxide filler was used. The sample was tested for thermal conductivity and for thermal stability under cyclic strain using the MER, as described above.

The thermal conductivity and MER results are summarized in Table 1.

Comparative Example 7

35% tungsten oxide ($WO_3$)

Formulation:

|  | vol % | wt % |
| --- | --- | --- |
| Poly(dimethyl siloxane) PS342.5 | 61.56 | 19.0 |
| TEOS | 3.21 | 1.00 |
| dibutyltin diacetate | 0.23 | 0.10 |
| tungsten oxide | 35.00 | 79.9 |

The slab was prepared for this sample as described in Comparative Example 4, except that 35 vol % tungsten oxide ($WO_3$) filler was used. The sample was tested for thermal conductivity and for thermal stability under cyclic strain using the MER, as described above.

The thermal conductivity and MER results are summarized in Table 1.

Comparative Example 8

35% titanium dioxide ($TiO_2$)

Formulation:

|  | vol % | wt % |
| --- | --- | --- |
| Poly(dimethyl siloxane) PS342.5 | 61.56 | 29.92 |
| TEOS | 3.21 | 1.56 |
| dibutyltin diacetate | 0.23 | 0.15 |
| titanium dioxide | 35.00 | 68.38 |

The slab was prepared for this sample as described in Comparative Example 4, except that 35 vol % titanium dioxide ($TiO_2$) filler was used. The sample was tested for thermal conductivity and for thermal stability under cyclic strain using the MER, as described above.

The thermal conductivity and MER results are summarized in Table 1.

Advantages

As Table 1 shows, the Examples and Comparative Examples demonstrate that the combination of zinc oxide and tin oxide fillers gives a reduction in change in storage modulus (S.M.) that is greater than would be expected from a linear combination of the two fillers alone while still giving high thermal conductivity. Zinc oxide fillers alone offer low weight loss, low creep, and little change in storage modulus during MER testing, but the thermal conductivity of formulations filled with zinc oxide is inferior to those filled with tin oxide. Tin oxide fillers alone offer low weight loss and low creep, but they show greater changes in storage modulus during MER testing than the zinc oxide filled formulations, particularly at higher filler contents. Replacement of as little ductivity over that of zinc oxide alone, giving a more stable, highly thermally conductive elastomer.

TABLE 1

Summary of MER and thermal conductivity testing results

| Example or Comparative Example | Initial S.M. (MPa) | Final S.M. (MPa) | Initial length (mm) | Final length (mm) | Change in S.M. (%) | Change in length (%) | Weight Loss (%) | Thermal condition (W/mK) |
|---|---|---|---|---|---|---|---|---|
| Example 1 | 9.573 | 10.256 | 12.232 | 11.777 | 7.1 | 3.7 | 0.62 | 0.87 |
| Example 2 | 9.979 | 10.211 | 12.115 | 11.795 | 2.3 | 2.6 | 0.44 | 0.85 |
| Example 3 | 13.181 | 16.508 | 12.385 | 12.041 | 25.2 | 2.8 | 0.59 | 0.90 |
| Example 4 | 16.337 | 17.683 | 12.615 | 12.283 | 9.3 | 2.6 | 0.47 | 0.97 |
| Example 5 | 16.079 | 20.166 | 12.577 | 12.309 | 25.4 | 2.1 | 0.28 | 1.07 |
| Comp. Ex. 1 | 11.855 | 10.771 | 4.242 | 7.938 | 87.1 | 9.1 | 0.32 | — |
| Comp. Ex. 2 | 4.801 | 4.765 | 11.867 | 11.073 | 0.8 | 6.7 | 0.39 | 0.60 |
| Example 6 | 5.100 | 4.810 | 11.979 | 11.266 | 5.7 | 6.0 | 0.44 | — |
| Example 7 | 7.698 | 7.190 | 12.256 | 11.489 | 6.6 | 6.3 | 0.53 | — |
| Example 8 | 10.587 | 10.907 | 12.465 | 12.063 | 3.0 | 3.2 | 0.46 | 0.76 |
| Comp. Ex. 3 | 9.202 | 8.068 | 12.832 | 12.543 | 12.3 | 2.3 | 0.19 | 0.93 |
| Comp. Ex. 4 | 1.516 | 1.534 | 8.007 | 7.414 | 1.2 | 7.3 | 0.57 | 0.36 |
| Example 9 | 2.341 | 2.118 | 11.214 | 9.736 | 9.5 | 13.2 | 0.84 | 0.40 |
| Example 10 | 3.320 | 3.043 | 11.466 | 10.491 | 8.3 | 8.5 | 0.51 | 0.47 |
| Comp. Ex. 5 | 4.971 | 6.622 | 11.464 | 5.430 | 34.3 | 52.6 | 3.94 | 0.75 |
| Comp. Ex. 6 | 8.811 | 2.900 | 3.738 | 0.943 | 67.1 | 74.8 | 7.39 | 0.65 |
| Comp. Ex. 7 | 9.491 | 7.329 | 4.716 | 16.138 | 22.8 | 242 | 4.26 | 0.44 |
| Comp. Ex. 8 | 9.652 | 7.699 | 4.022 | 8.416 | 20.2 | 109 | 2.58 | 0.52 | as 2% of the tin oxide with zinc oxide in a formulation that contains 40 vol % total filler (Example 5) results in a decrease in the change in storage modulus after 60 hours of MER testing from 87% for tin oxide filler alone (Comparative Example 1) to 25% for 2% zinc oxide/38% tin oxide (Example 5). Further, the thermal conductivity of a sample containing the combination of tin oxide and zinc oxide fillers (e.g., Example 8) is significantly higher than that of a sample containing the same vol % filler but of only zinc oxide (e.g., Comparative Example 2). Similar patterns of lower changes in storage modulus compared to tin oxide filler alone and higher thermal conductivities than zinc oxide alone are shown at 40 vol %, 30 vol % and 15 vol % total filler content in the Examples and Comparative Examples. These advantages are obtained while still maintaining the low creep and the low weight loss associated with each of the fillers individually.

The advantages of using materials filled with the combination of tin oxide and zinc oxide fillers for improved thermal stability under cyclic stress are further illustrated by comparison with Comparative Examples 5–8, wherein other fillers commonly used in PDMS elastomers are examined. The results show that the combination of tin oxide and zinc oxide fillers in particular impart unexpected improvements in thermal stability of PDMS elastomers.

MER testing has demonstrated that the combination of zinc oxide and tin oxide fillers offer improved thermal stability (decreased change in hardness, decreased creep, and decreased weight loss in MER testing) compared to currently available thermally conductive elastomers for use in fusing applications. Clearly, the improved stability arises from the specific choice of filler used, as the aluminum oxide-, aluminum oxide/iron oxide-, tungsten oxide-, and titanium dioxide-filled samples did not exhibit similar improvements. Further, the combination of the two fillers offers the advantage of improving the thermal stability over that of tin oxide alone and of improving the thermal con- The invention has been described with particular reference to preferred embodiments thereof but it will be understood that variations and modifications can be effected within the spirit and scope of the invention.

We claim:

1. A fuser member having a layer comprising a condensation-cured poly(dimethyl siloxane) elastomer filled with a mixture of tin oxide and zinc oxide wherein
   the layer contains from about 5 to about 40 volume percent of said mixture and wherein the proportion of tin oxide to zinc oxide in said mixture is between about 25:1 and 1:25 by volume.

2. A fuser member according to claim 1 wherein the proportion of tin oxide to zinc oxide in said mixture is between about 19:1 and 1:19 by volume.

3. A fuser member according to claim 1 wherein the proportion of tin oxide to zinc oxide is about 19:1 by volume.

4. A fuser member according to claim 1 wherein said layer contains from about 15 to about 40 volume percent of said mixture.

5. A fuser member according to claim 1 wherein said poly(dimethyl siloxane) elastomer comprises: a) 55–90 vol % silanol-terminated (α,ω-hydroxy-)poly(dimethyl siloxane); b) 2–5.00 vol % crosslinker and c) 0.1–0.4 vol % catalyst.

6. A fuser member according to claim 5 wherein silanol terminated (α,ω-hydroxy-)poly(dimethyl siloxane) has the formula:

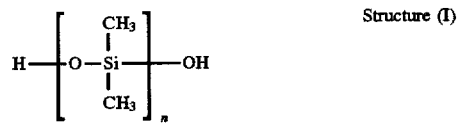

Structure (I)

wherein n is an integer such that the Structure (I) polymer has a weight average molecular weight of from 7,000 to 70,000.

7. A fuser member according to claim 5 wherein said crosslinker is selected from the group consisting of tetramethylorthosilicate, tetraethylorthosilicate, 2-methoxyethylsilicate, tetrahydro-furfurylsilicate, ethylpolysilicate, butylsilicate, methyltripropenoxysilane, methyltriacetoxysilane, methyltris(butanone oxime)silane, and methyltris-(diethylamino)silane.

8. A fuser member according to claim 1 wherein the condensation-cured poly(dimethyl siloxane) elastomer is formed by a condensation reaction of silanol-terminated poly(dimethyl siloxane) polymers with multifunctional silanes, each of said silanes comprising a silicon atom bonded to at least 3 groups that are functional so as to condense with hydroxy end groups of said silanol-terminated poly(dimethyl siloxane) polymer so as to crosslink through the silicon atom of the silane.

9. The fuser member according to claim 8 where each of said functional groups of said multifunctional silane independently comprises an acyloxy, alkenoxy, alkoxy, dialkylamino or alkyliminoxy group.

10. The fuser member according to claim claim 8 wherein said functional groups comprises alkoxy groups and wherein the condensation reaction is carried out with the aid of a catalyst for the reaction.

11. The fuser member according to claim 1 wherein an oil-barrier layer is coated over the layer comprising a condensation-cured poly(dimethyl siloxane) elastomer filled with a mixture of tin oxide and zinc oxide.

12. The fuser member according to claim 11 further comprising a wear-resistant outermost layer over said oil-barrier layer.

* * * * *